US005921166A

United States Patent [19]

Machida et al.

[11] Patent Number: 5,921,166

[45] Date of Patent: Jul. 13, 1999

[54] CYLINDER APPARATUS

[75] Inventors: Hiromi Machida; Tetsuo Katoh; Yasuo Inose; Hiroshi Murata, all of Kanagawa-ken, Japan

[73] Assignee: Tokico, Ltd., Kanagawa-ken, Japan

[21] Appl. No.: 08/845,414

[22] Filed: Apr. 25, 1997

[30] Foreign Application Priority Data

Apr. 27, 1996 [JP] Japan .................................... 8-131234

[51] Int. Cl.[6] .............................. F16J 15/18; F16J 15/32

[52] U.S. Cl. .......................... 92/168; 92/165 R; 277/435; 277/580; 277/589; 277/928

[58] Field of Search .................................... 92/86, 165 R, 92/168, 166, 167; 277/435, 448, 451, 580, 582, 589, 928

[56] References Cited

U.S. PATENT DOCUMENTS

| | | | |
|---|---|---|---|
| 2,437,586 | 3/1948 | Aber | 277/582 |
| 3,726,531 | 4/1973 | Pagan et al. | 277/580 X |
| 4,422,650 | 12/1983 | Reinsma et al. | 277/928 X |
| 4,494,760 | 1/1985 | Spargo | 277/928 X |
| 4,987,826 | 1/1991 | Deppert et al. | 92/165 R X |
| 5,098,071 | 3/1992 | Umetsu | 277/589 X |
| 5,143,382 | 9/1992 | Maringer | 277/589 X |

FOREIGN PATENT DOCUMENTS

| | | |
|---|---|---|
| 2-24158 | 2/1990 | Japan . |
| 2-41767 | 3/1990 | Japan . |

OTHER PUBLICATIONS

Müller, H.K., Hydraulikstangenabdichtung bei sehr hohem Druck, o+p"Öhydraulik und pneumatik" 32 (1988) No. 4, pp. 262 to 264.

*Primary Examiner*—Hoang Nguyen
*Attorney, Agent, or Firm*—Wenderoth, Lind & Ponack, L.L.P.

[57] ABSTRACT

A cylinder apparatus including a piston slidably fitted in a cylinder having a hydraulic fluid sealed therein. A piston rod is connected at one end thereof to the piston. The other end portion of the piston rod extends as far as the outside of the cylinder through a seal block fitted to an open end portion of the cylinder. The seal block retains a double seal including a rod seal that is in sliding contact with the piston rod and an O-ring that resiliently biases the rod seal toward the piston rod. The seal block is provided with a projection extending between the O-ring and the rod seal to bear a part of biasing force applied to the rod seal from the O-ring. The projection is provided at a side of the O-ring and rod seal which is remote from the piston.

6 Claims, 7 Drawing Sheets

CYLINDER APPARATUS

BACKGROUND OF THE INVENTION

The present invention relates to a cylinder apparatus installed, for example, on a suspension system of an automobile.

Examples of cylinder apparatus installed on suspension systems of automobiles include hydraulic cylinders for vehicle height control and hydraulic dampers for shock absorption.

A known cylinder apparatus has a cylinder having a hydraulic fluid sealed therein; a piston sliding in the cylinder; and a piston rod connected at one end thereof to the piston. The other end portion of the piston rod projects from the cylinder. A seal block is provided between the piston rod and one end of the cylinder.

The seal block has a circumferential groove provided in the inner periphery thereof. A seal device is accommodated in the groove. The seal device has the form of a double seal including a seal ring engaged with the piston rod and an O-ring for pressing the seal ring against the piston rod.

This type of cylinder apparatus suffers from the problem that the O-ring is deformed by the pressure of hydraulic fluid in the cylinder, and this may cause the seal ring to engage the piston rod so strongly that the piston rod cannot smoothly slide.

BRIEF SUMMARY OF THE INVENTION

In view of the above-described problem associated with the conventional cylinder apparatus, an object of the present invention is to prevent the frictional resistance of the rod seal backed up by the O-ring from increasing more than necessary.

The present invention is applied to a cylinder apparatus wherein a piston is slidably fitted in a cylinder having a hydraulic fluid sealed therein. A piston rod is connected at one end thereof to the piston. The other end portion of the piston rod extends as far as the outside of the cylinder through a seal block fitted to an open end portion of the cylinder. The seal block retains a double seal including a rod seal that is in sliding contact with the piston rod and an O-ring that resiliently biases the rod seal toward the piston rod. According to the present invention, the seal block is provided with a projection extending between the O-ring and the rod seal to bear a part of biasing force applied to the rod seal from the O-ring. The projection is provided at a side of the O-ring and rod seal which is remote from the piston.

The cylinder apparatus according to the present invention may be further provided with an oil seal. In this case, the arrangement may be such that the double seal and the oil seal are retained in series in the axial direction of the cylinder to form a two-stage seal structure, and the hydraulic fluid in a reservoir chamber formed between the double seal and the oil seal is released through a hydraulic fluid passage provided in the seal block to an annular chamber between the cylinder and an outer cylinder surrounding the cylinder. Another feature of the present invention resides in that a pressure retaining device is provided in the hydraulic fluid passage so that the pressure in the reservoir chamber rises when the pressure in the cylinder rises.

DETAILED DESCRIPTION OF THE INVENTION

Prior to the description of embodiments of the present invention, one example according to the prior art will be described with a view to facilitating the understanding of the present invention.

Figure 7:
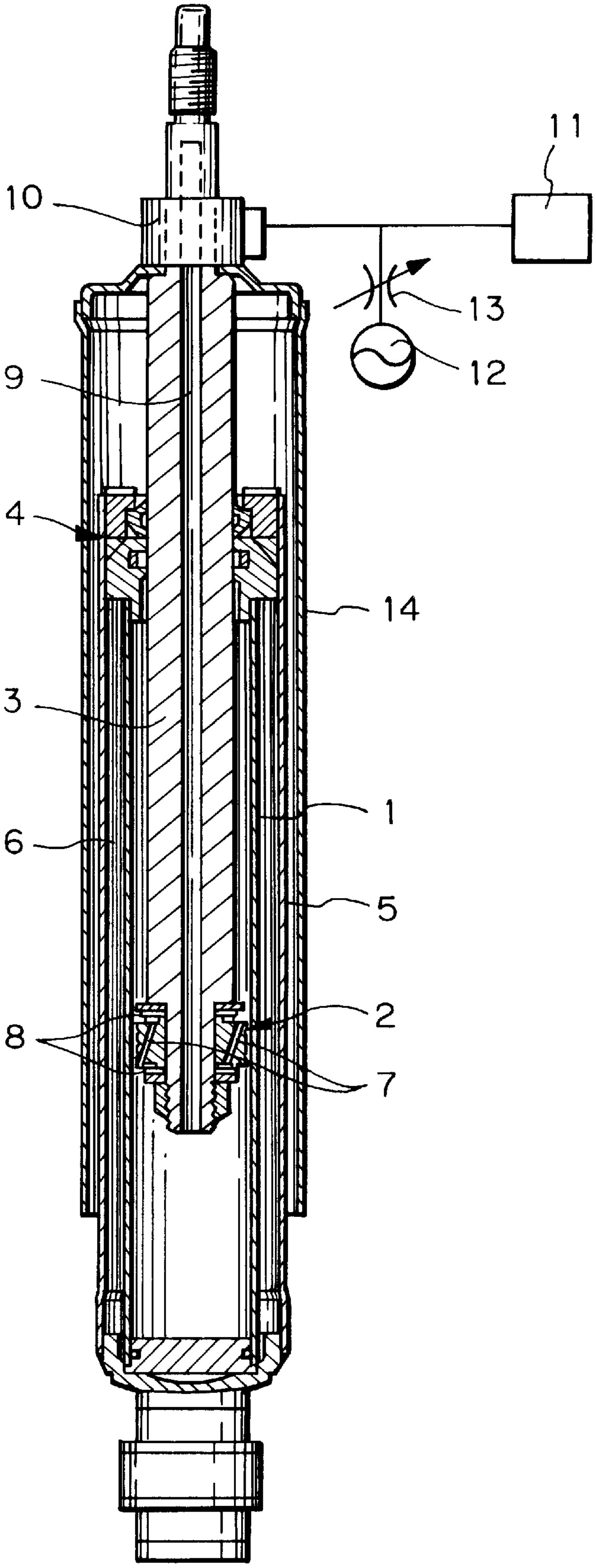
Fig. 7 PRIOR ART
FIG. 7 is a sectional view showing the whole structure of a general hydraulic cylinder apparatus.

FIG. 7 shows a hydraulic cylinder apparatus installed on a suspension controller that controls the vehicle height. The hydraulic cylinder apparatus includes a cylinder 1 having a hydraulic fluid sealed therein. A piston 2 is slidably fitted in the cylinder 1. A piston rod 3 is connected at one end thereof to the piston 2. A seal device 4 (described later) is fitted to an open end portion of the cylinder 1. The other end portion of the piston rod 3 extends through the seal device 4 in a fluid-tight manner as far as the outside of the cylinder 1. The cylinder 1 is accommodated in an outer cylinder 5, one end of which is closed. A space between the cylinder 1 and the outer cylinder 5 is closed by the seal device 4 to provide a drain chamber (annular chamber) 6. The piston 2 is provided with hydraulic fluid passages 7 for providing communication between a pair of upper and lower chambers defined in the cylinder 1 by the piston 2. The piston 2 is further provided with disk valves 8 that generate damping force by controlling the flow of hydraulic fluid through the hydraulic fluid passages 7. The piston rod 3 is provided therein with a hydraulic fluid passage 9 for supplying and discharging the hydraulic fluid into and from the cylinder 1. The other end portion of the piston rod 3 is connected through a pipe joint 10 to a hydraulic fluid supply and discharge device 11 and also to an accumulator 12 as a spring element and a damping force control valve 13 as a damping element. It should be noted that reference numeral 14 denotes a protective cover fitted on and fixed to the piston rod 3 at a position outside the cylinder 1.

In the above hydraulic cylinder apparatus, the hydraulic fluid is supplied into and discharged from the cylinder 1 by the hydraulic fluid supply and discharge device 11 through the hydraulic fluid passage 9. In response to the supply and discharge of the hydraulic fluid, the amount of extension of the piston rod 3 changes, and thus the vehicle height is controlled. Further, the flow resistance of hydraulic fluid, which flows between the cylinder 1 and the accumulator 12 in response to the extension and contraction of the piston rod 3, is changed by the damping force control valve 13 to thereby control damping force.

Figure 8:
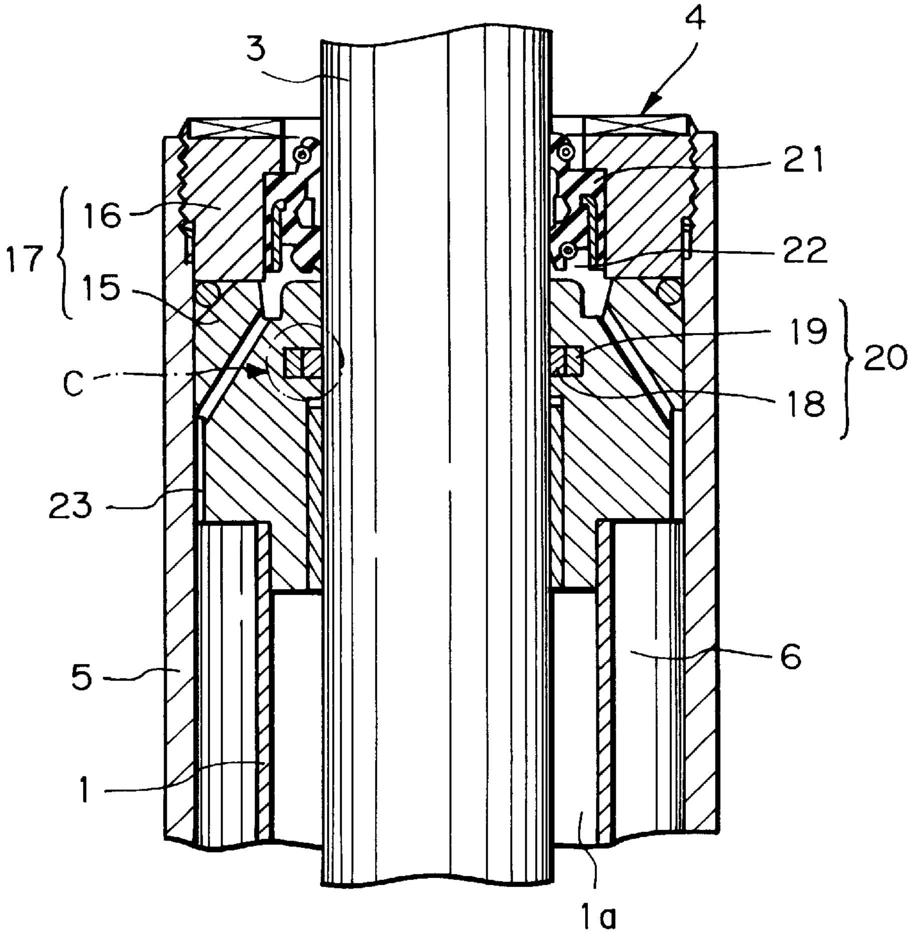
Fig. 8 PRIOR ART
FIG. 8 is a sectional view showing a conventional seal structure.
Figure 9:
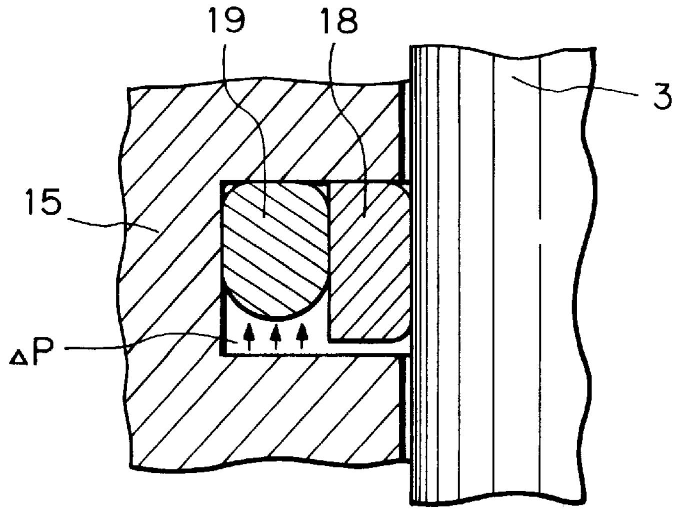
Fig. 9 PRIOR ART
FIG. 9 is an enlarged sectional view showing part C in FIG. 8.

As shown in FIGS. 8 and 9, the seal device 4 has a seal block 17 including a rod guide 15 fitted to both the cylinder 1 and the outer cylinder 5 to slidably guide the piston rod 3. The seal block 17 further includes a lock ring 16 engaged with the outer cylinder 5 to press the rod guide 15 from above it. The rod guide 15 retains a double seal 20. The double seal 20 includes a rod seal 18 that is in sliding contact with the piston rod 3, and an O-ring 19 resiliently biasing (backing up) the rod seal 18 toward the piston rod 3. The lock ring 16 retains an oil seal 21.

The rod seal 18, which constitutes the double seal 20, is formed from a material excellent in sliding performance because sliding properties are regarded as important, and slight fluid leakage occurs from the area of sliding contact between the rod seal 18 and the piston rod 3 as the hydraulic pressure in the cylinder chamber 1*a* rises. On the other hand, the oil seal 21 is formed from a rubber material having excellent sealing properties, so that the hydraulic fluid (leakage fluid) leaking out from the area between the rod seal 18 and the piston rod 3 is prevented from leaking to the outside by the oil seal 21. The hydraulic fluid thus prevented from leaking to the outside is temporarily stored in a reservoir chamber 22 formed between the double seal 20 and the oil seal 21 and then released to the drain chamber 6 through a hydraulic fluid passage 23 provided in the rod guide 15.

In the above-described conventional hydraulic cylinder apparatus, when the hydraulic pressure in the cylinder chamber 1*a* rises in excess of a certain level, the O-ring 19 is pushed upwardly and thus strongly compressed by a differential pressure ΔP between the cylinder chamber 1*a* and the reservoir chamber 22, causing the rod seal 18 to be strongly pressed against the piston rod 3. As a result, the frictional resistance of the rod seal 18 increases, thus preventing the piston rod 3 from smoothly extending and contracting, and causing the ride quality to be degraded. Moreover, the wear of the rod seal 18 increases, and the fluid leakage increases correspondingly.

In hydraulic shock absorbers also, the double seal 20, which includes the rod seal 18 and the O-ring 19, is frequently employed, and similar problems arise. However, in the case of a hydraulic shock absorber, the annular chamber 6 around the cylinder 1 is provided as a reservoir.

Next, embodiments of the present invention will be described with reference to the accompanying drawings.

Figure 1:
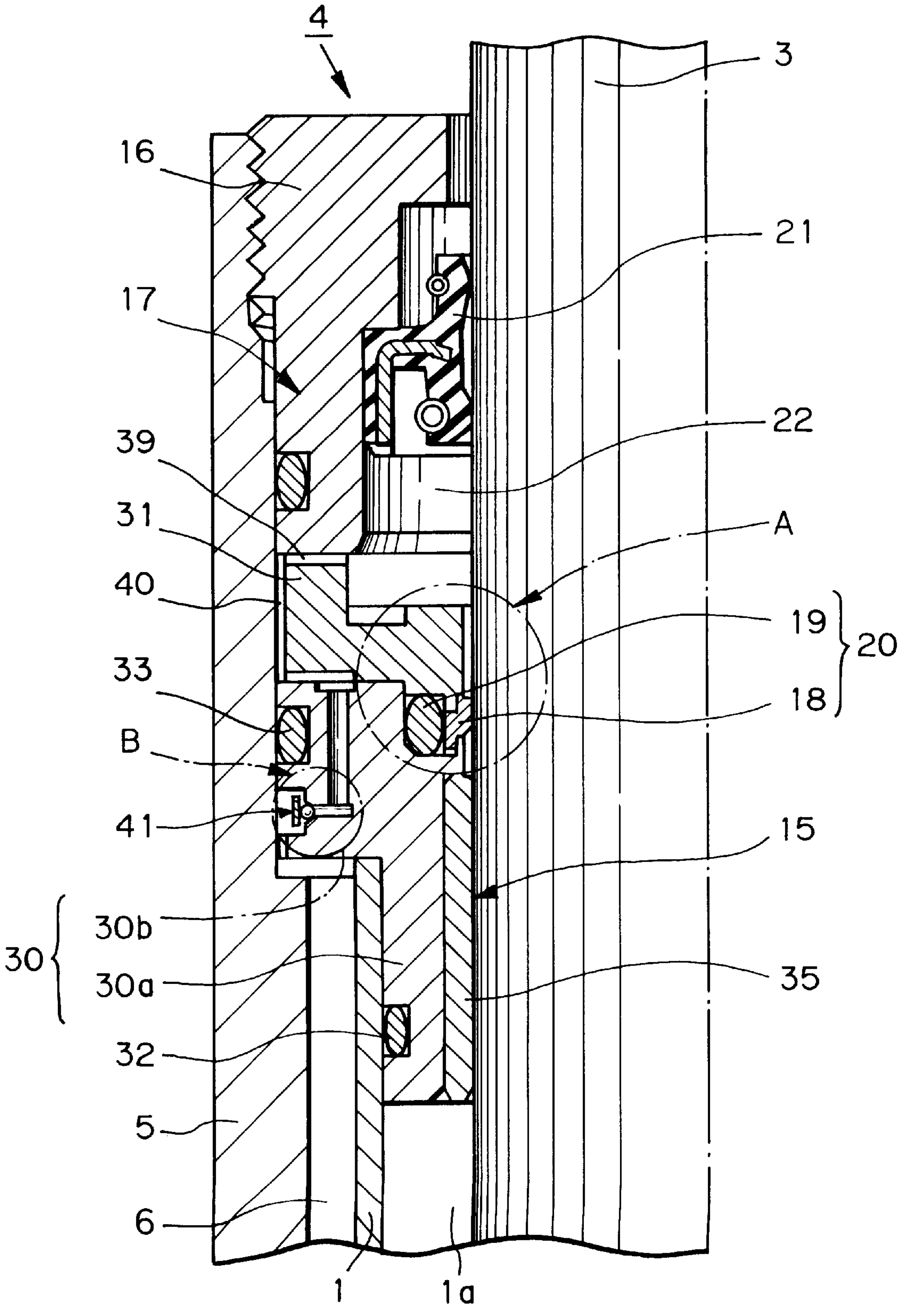
FIG. 1 is a sectional view showing the structure of an essential part of a hydraulic cylinder apparatus according to a first embodiment of the present invention.
Figure 2:
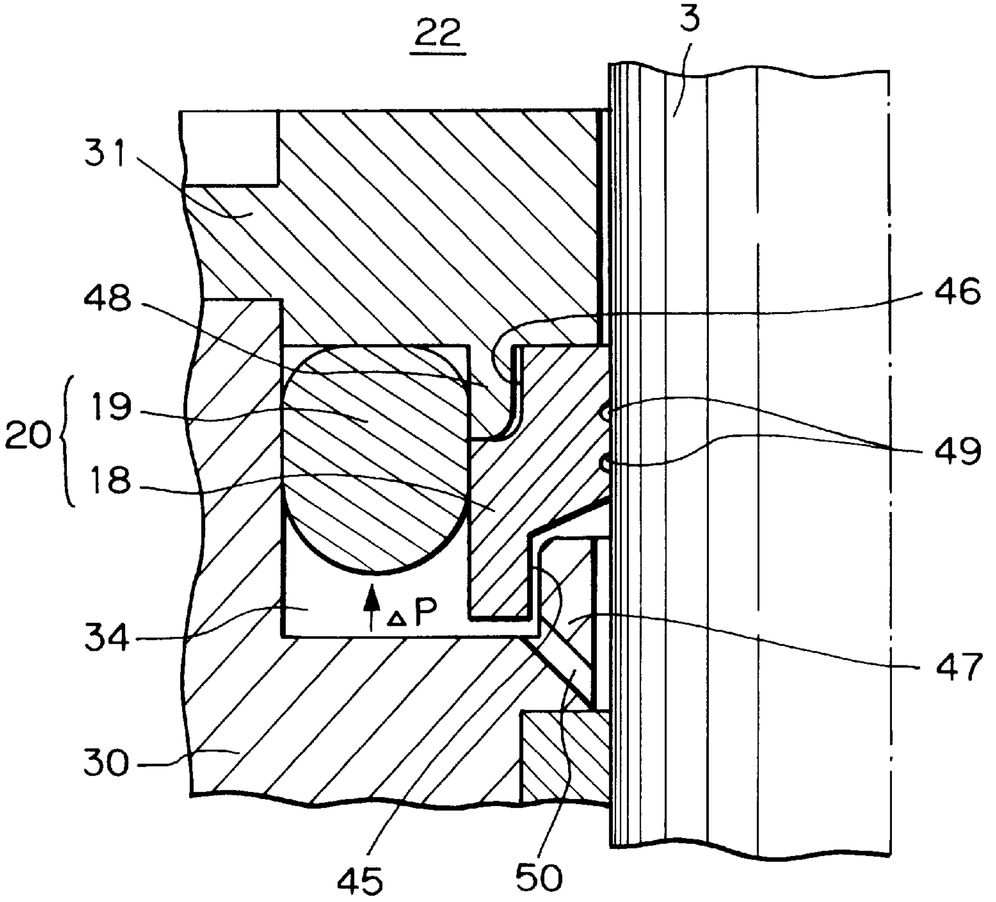
FIG. 2 is an enlarged sectional view showing part A in FIG. 1.
Figure 3:
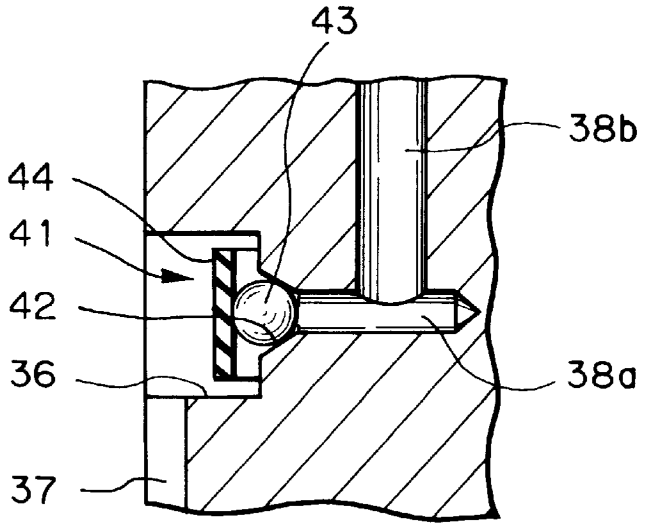
FIG. 3 is an enlarged sectional view showing part B in FIG. 1.

FIGS. 1 to 3 show a first embodiment of the present invention. In the following embodiment, improvements are made to the seal device 4 of the above-described hydraulic cylinder apparatus installed on a suspension controller, and the overall structure of the embodiment is the same as that shown in FIG. 7. Therefore, only an essential part of the embodiment is shown in the figures, and the same members or portions are denoted by the same reference characters. In the first embodiment, the rod guide 15, which constitutes a seal block 17 of the seal device 4, includes a guide body 30 disposed on a side of the rod guide 15 closer to the cylinder 1, and a cover member 31 disposed at an end of the rod guide 15 closer to the lock ring 16.

The guide body 30 has a small-diameter portion 30*a* having a relatively small outer diameter, and a large-diameter portion 30*b* having a relatively large outer diameter. The small-diameter portion 30*a* is fitted to the cylinder 1 with a seal member 32 interposed therebetween, and the large-diameter portion 30*b* is fitted to the outer cylinder 5 with a seal member 33 interposed therebetween, thereby closing the respective open ends of the cylinder chamber 1*a* and the drain chamber 6 in a fluid-tight manner. The cover member 31 is fitted to the top surface of the guide body 30 by screwing the lock ring 16 into the outer cylinder 5. In this state, an annular groove 34 (see FIG. 2) is formed between the cover member 31 and the guide body 30 to accommodate the double seal 20, which includes the rod seal 18 and the O-ring 19. It should be noted that a bush 35 is fitted to the inner periphery of the guide body 30, and the piston rod 3, which extends from the piston 2 (see FIG. 7) in the cylinder 1, is in sliding contact indirectly with the guide body 30 through the bush 35.

As shown clearly in FIG. 3, an annular groove 36 is formed in the outer peripheral surface of the large-diameter portion 30*b* of the guide body 30. The annular groove 36 is communicated with the drain chamber 6 as an annular chamber through an axial groove 37 provided in the outer peripheral surface of the guide body 30. Moreover, the annular groove 36 is communicated with the top surface of the guide body 30 through a radial hole 38*a* and an axial hole 38*b*, which are provided in the guide body 30 (see FIG. 3). On the other hand, a series of grooves 39 are formed in the top, bottom and outer peripheral surfaces of the cover member 31. The series of grooves 39 connect at one end thereof with the axial hole 38*b* of the guide body 30 and at the other end thereof with the reservoir chamber 22. The annular groove 36, the axial groove 37, the radial hole 38*a* and the axial hole 38*b*, which are provided in the guide body 30, and the grooves 39 of the cover member 31 constitute a hydraulic fluid passage 40 for providing communication between the reservoir chamber 22 and the drain chamber 6.

A check valve 41 as a pressure retaining device is provided on the bottom of the annular groove 36 of the guide body 30. As shown clearly in FIG. 3, the check valve 41 includes a valve seat 42 formed on the open end portion of the radial hole 38*a*; a ball 43 that selectively rests on and separates from the valve seat 42; and an elastic band 44 that normally biases the ball 43 in the direction in which the ball 43 rests on the valve seat 42. The elastic band 44 is made of an elastic material, e.g. rubber. That is, the check valve 41 normally operates to close the hydraulic fluid passage 40, thereby retaining a predetermined hydraulic pressure in the reservoir chamber 22.

As shown clearly in FIG. 2, the rod seal 18, which constitutes the double seal 20 retained by the rod guide 15, has a step portion 45 formed on the lower portion (closer to the cylinder chamber 1*a*) of the inner peripheral surface of the rod seal 18. The rod seal 18 further has a step portion 46 formed on the upper portion (closer to the reservoir chamber 22) of the outer peripheral surface of the rod seal 18. On the other hand, the guide body 30, which constitutes the rod guide 15, has a projection 47 provided on the inner peripheral portion thereof. The projection 47 is fittable to the step portion 45. The cover member 31, which also constitutes the rod guide 15, has a projection 48 provided on the lower surface thereof. The projection 48 is fittable to the step portion 46. It should be noted that the inner peripheral surface of the rod seal 18 is provided with a plurality of annular grooves 49 with intention of attaining oil film retention by the so-called labyrinth effect. The provision of the annular grooves 49 enables the frictional resistance to be reduced. The proximal portion of the projection 47 provided on the guide body 30 is provided with a communicating passage 50 that ensures the flow of hydraulic fluid between the annular groove 34 and the inner peripheral side of the guide body 30.

In the hydraulic cylinder apparatus arranged as described above, when the pressure in the cylinder chamber 1*a* rises in response to the supply of hydraulic fluid into the cylinder 1 by the hydraulic fluid supply and discharge device 11 (see FIG. 7), fluid leakage occurs from a slight gap between the rod seal 18 and the piston rod 3. At this time, the hydraulic fluid passage 40, which provides communication between the reservoir chamber 22 inside the oil seal 21 and the drain chamber 6, has been closed by the check valve 41. Therefore, the leakage fluid is gradually stored in the reservoir chamber 22, and the pressure in the reservoir chamber 22 gradually rises. Consequently, the differential pressure ΔP between the cylinder chamber 1*a* and the reservoir chamber 22 will not considerably increase, and the O-ring 19, which backs up the rod seal 18, will not very strongly be compressed. Accordingly, there is no possibility of the rod seal 18 being strongly pressed against the piston rod 3. In other words, an increase in the frictional resistance of the rod seal 18 is effectively suppressed, and the smooth extending and contracting movement of the piston rod 3 is ensured.

Under the above-described conditions, if the pressure in the cylinder chamber 1*a* is temporarily raised by the influence of the load applied to the hydraulic cylinder apparatus, the differential pressure ΔP between the cylinder chamber 1*a* and the reservoir chamber 22 temporarily increases. Consequently, as shown in FIG. 2, the O-ring 19 in the annular groove 34 is strongly compressed between the guide body 30, the cover member 31 and the rod seal 18, causing the rod seal 18 to be strongly pressed against the piston rod 3. At this time, the projection 48 provided on the cover member 31 bears a portion of the pressing force applied to the rod seal 18. As a result, there is no likelihood that the rod seal 18 will be strongly pressed against the piston rod 3. Accordingly, an increase in the frictional resistance is suppressed, and the smooth extending and contracting movement of the piston rod 3 is ensured.

Meanwhile, when the amount of hydraulic fluid leaking from the gap between the rod seal 18 and the piston rod 3 increases, the pressure in the reservoir chamber 22 increases correspondingly. Consequently, it may occur that the differential pressure ΔP is steadily inverted. When the inverted differential pressure (−ΔP) temporarily increases, the O-ring 19 in the annular groove 34 is pushed downwardly and strongly compressed between the guide body 30 and the rod seal 18, causing the rod seal 18 to be strongly pressed against the piston rod 3. At this time, the projection 47 provided on the guide body 30 bears a portion of the pressing force applied to the rod seal 18. As a result, there is no likelihood that the rod seal 18 will be strongly pressed against the piston rod 3. Accordingly, an increase in the frictional resistance is suppressed, and the smooth extending and contracting movement of the piston rod 3 is ensured as in the case of the above. It should be noted that at this time the rod seal 18 comes in close contact with the projection 47; however, since the communicating passage 50 ensures the flow of hydraulic fluid into and from the annular groove 34, the O-ring 19 returns to the previous upper position as the inverted differential pressure reduces.

Figure 4:
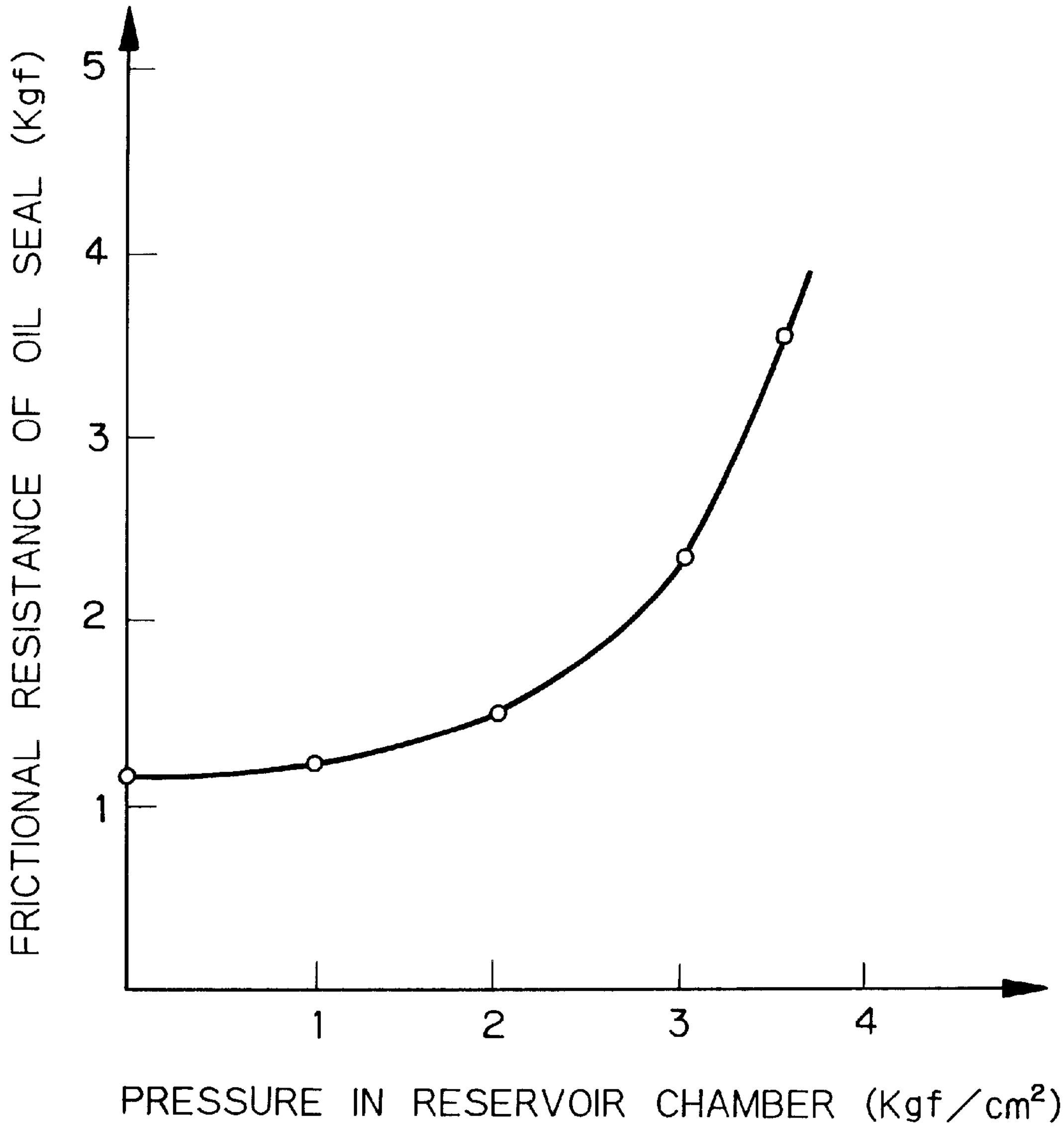
FIG. 4 is a graph showing a correlation between the pressure in a reservoir chamber and the frictional resistance of an oil seal.

Thereafter, as the amount of leakage fluid increases, the pressure in the reservoir chamber 22 further rises, causing the check valve 41 to open. Consequently, the hydraulic fluid in the reservoir chamber 22 is released to the drain chamber 6 through the hydraulic fluid passage 40. Thus, the inverted differential pressure (−ΔP) will not become higher than the required level. In other words, the force with which the O-ring 19 presses the rod seal 18 against the piston rod 3 is effectively controlled, and thus an increase in the frictional resistance is suppressed. Accordingly, if the valve-opening pressure for the check valve 41 is appropriately set in advance, the differential pressure ΔP between the cylinder chamber 1*a* and the reservoir chamber 22 or the inverted differential pressure (−ΔP) can be controlled within a predetermined range, and it is possible to suppress an increase in the frictional resistance of the rod seal 18. It should, however, be noted that the pressure in the reservoir chamber 22 and the frictional resistance of the oil seal 21 are correlated with each other, as shown in FIG. 4, such that the frictional resistance of the oil seal 21 rapidly increases after the pressure in the reservoir chamber 22 exceeds about 2 $kgf/cm^2$ (about 196 Pa). Therefore, it is desirable to set the valve-opening pressure for the check valve 41 at an appropriate value not higher than 2 $kgf/cm^2$.

Figure 5:
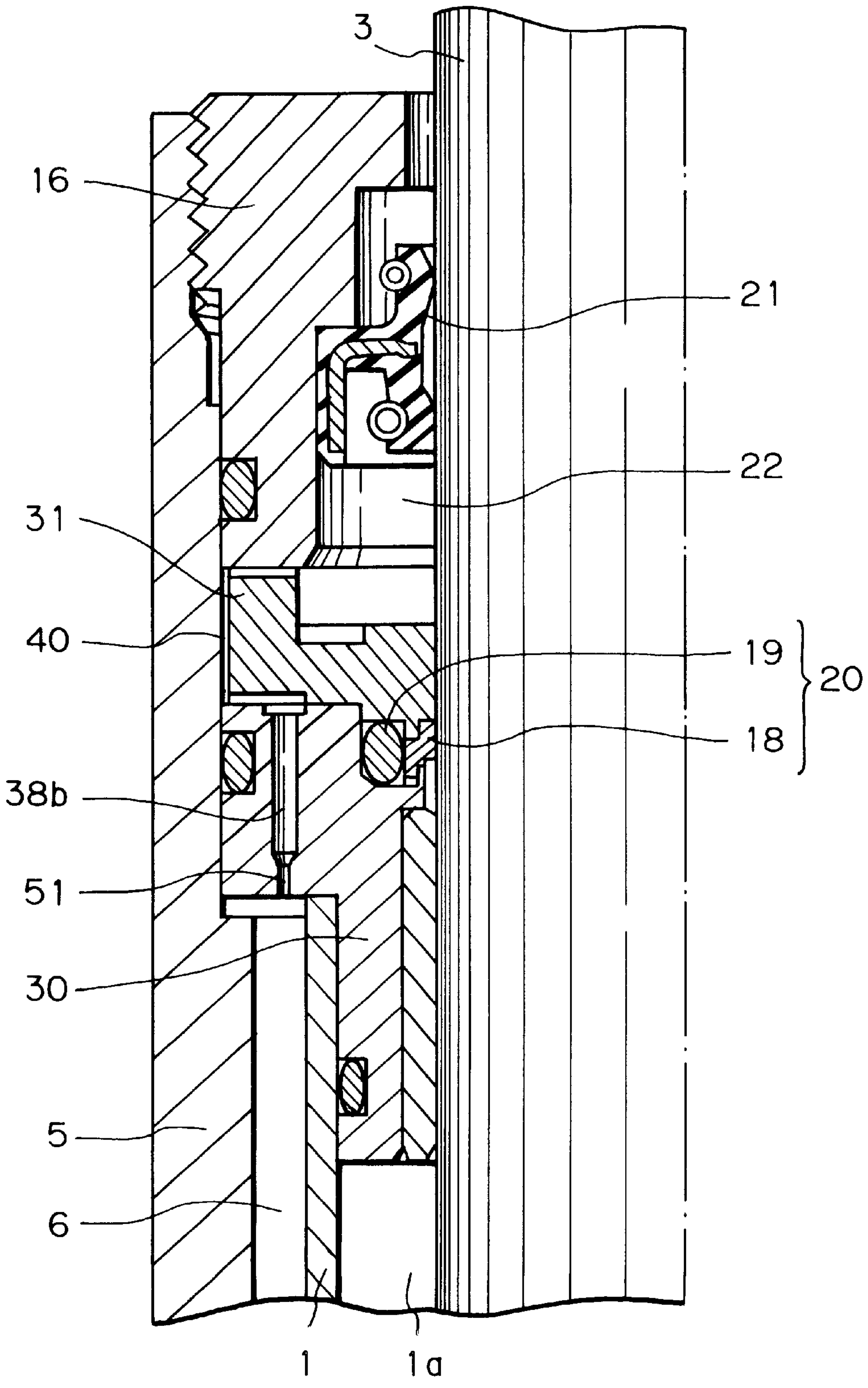
FIG. 5 is a sectional view showing the structure of an essential part of a hydraulic cylinder apparatus according to a second embodiment of the present invention.

FIG. 5 shows a second embodiment of the present invention. The feature of the second embodiment resides in that the check valve 41 in the first embodiment is removed, and the axial hole 38*b* provided in the guide body 30 is communicated with the drain chamber 6 through an orifice 51 as a pressure retaining device. According to the second embodiment, the orifice 51 retains the hydraulic pressure in the reservoir chamber 22. Thus, the differential pressure ΔP between the cylinder chamber 1*a* and the reservoir chamber 22 will not considerably increase, and the O-ring 19 will not strongly be compressed as in the case of the above. Consequently, there is no possibility of the rod seal 18 being strongly pressed against the piston rod 3. However, the orifice 51 cannot steadily increase the pressure in the reservoir chamber 22 so high as the check valve 41. Therefore, there is a limit in capability of reducing the differential pressure ΔP. Consequently, there may be an increase in the number of occasions at which the differential pressure increases owing to a pressure rise in the cylinder chamber 1*a*. However, the projection 48 (see FIG. 2) provided on the cover member 31 mainly bears the pressing force from the O-ring 19. Therefore, an increase in the frictional resistance of the rod seal 18 can be suppressed.

Figure 6:
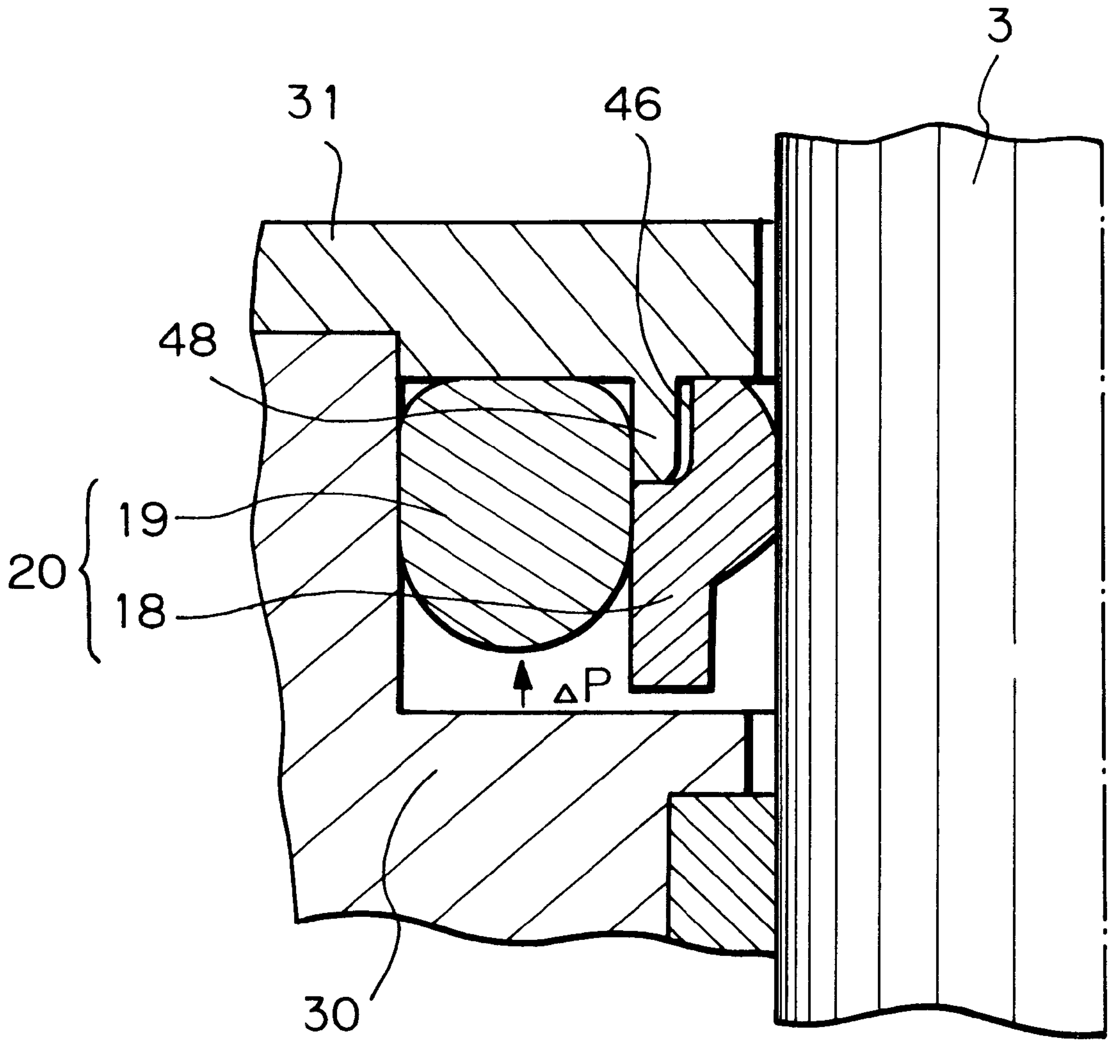
FIG. 6 is a sectional view showing a rod seal portion according to another embodiment.

It should be noted that there is no considerable rise or almost no rise in the pressure in the reservoir chamber 22 in an arrangement wherein the hydraulic fluid passage 40 is provided with the orifice 51 as in the second embodiment or in an arrangement wherein the orifice 51 is omitted and the hydraulic fluid passage 40 is completely opened. Therefore, in such an arrangement, it suffices to consider only an increase of the differential pressure ΔP due to a pressure rise in the cylinder chamber 1*a*. In this case, the arrangement may be such that, as shown in FIG. 6, the projection 47 (see FIG. 2) on the guide body 30 is omitted, and only the projection 48 is provided on the cover member 31.

As has been detailed above, the cylinder apparatus according to the present invention is arranged such that the rod seal is prevented from being strongly pressed against the piston rod by the O-ring. Therefore, the frictional resistance of the rod seal is prevented from increasing more than necessary, and thus the smooth extending and contracting movement of the piston rod is ensured. Moreover, the wear of the rod seal is minimized, and degradation of the sealing properties is prevented.

What is claimed is:

1. A cylinder apparatus comprising a cylinder having a hydraulic fluid sealed therein; a piston slidably fitted in said cylinder; a piston rod connected at one end thereof to said piston, the other end portion of said piston rod extending to the outside of said cylinder through a seal block fitted to an open end portion of said cylinder; and a double seal provided in a groove provided on a side of said seal block facing said piston rod, said double seal including a rod seal that is in sliding contact with said piston rod, and an O-ring that resiliently biases said rod seal toward said piston rod, wherein said groove has a first side surface on a side thereof remote from said piston, and a second side surface on a side thereof closer to said piston; each of said rod seal and O-ring has a first end portion supported by the first side surface of said groove; and said first side surface is provided with a projection extending toward the second side surface of said groove between said rod seal and O-ring to bear a part of biasing force applied to said rod seal from said O-ring.

2. A cylinder apparatus according to claim 1, wherein the second side surface of said groove is provided with a second projection extending toward said first side surface, said second projection being engageable with said rod seal to bear a part of the biasing force applied to said rod seal from said O-ring.

3. A cylinder apparatus according to claim 2, wherein said second projection is provided with a communicating passage that provides communication between said cylinder and said groove provided in said seal block.

4. A cylinder apparatus according to any one of claims 1 to 3, wherein an oil seal is provided on a side of said double seal remote from said piston to form a two-stage seal structure, and a hydraulic fluid in a reservoir chamber formed between said double seal and said oil seal is released through a hydraulic fluid passage provided in said seal block to an annular chamber between said cylinder and an outer cylinder surrounding said cylinder, and wherein pressure retaining means is provided in said hydraulic fluid passage so that a pressure in said reservoir chamber rises when a pressure in said cylinder rises.

5. A cylinder apparatus according to claim 4, wherein said pressure retaining means is a check valve that allows flow of hydraulic fluid from said reservoir chamber to said annular chamber, said check valve being arranged to open when the pressure in said reservoir chamber reaches a predetermined level.

6. A cylinder apparatus according to claim 4, wherein said pressure retaining means is an orifice that applies resistance to flow of hydraulic fluid from said reservoir chamber to said annular chamber.

* * * * *